United States Patent
Cai et al.

(10) Patent No.: US 7,945,241 B2
(45) Date of Patent: May 17, 2011

(54) CHARGING FOR ROAMING USERS IN IMS NETWORKS

(75) Inventors: Yigang Cai, Naperville, IL (US); Shiyan Hua, Lisle, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 831 days.

(21) Appl. No.: 11/862,413

(22) Filed: Sep. 27, 2007

(65) Prior Publication Data

US 2009/0088129 A1   Apr. 2, 2009

(51) Int. Cl.
*H04M 11/00*   (2006.01)

(52) U.S. Cl. ... 455/406; 455/407; 455/408; 379/114.03; 379/114.28; 379/115.01

(58) Field of Classification Search ............. 455/406, 455/407, 408, 414.1, 418, 432.1; 379/114.01–114.1, 379/114.21, 114.28, 126
See application file for complete search history.

(56) References Cited

U.S. PATENT DOCUMENTS

| | | | | |
|---|---|---|---|---|
| 5,483,575 | A * | 1/1996 | Zdanowski et al. | 455/508 |
| 7,145,994 | B2 * | 12/2006 | Moreau et al. | 379/114.01 |
| 7,181,193 | B2 * | 2/2007 | Ansamaa | 455/406 |
| 7,624,266 | B2 * | 11/2009 | Gabor | 713/168 |
| 2002/0068545 | A1 * | 6/2002 | Oyama et al. | 455/406 |

OTHER PUBLICATIONS

Alcatel: "Message FLows for the Distribution of the charging Correlation Information during the SIP Session Setup, Call from the Application," 3GPP Draft; S2-020514, 3rd Generation Partnership Project (3GPP), Mobile Competence Centre; 650, Route des Lucioles; F-06921 Sophia-Antipolis Cedex; France; vol. tsg_sa/WG2_Arch/TSGS2_23/set_02, No. Sophia Antipolis, France; (Feb. 13, 2002), XP050238071.
3GPP: 3rd Generation Partnership Project; Technical Specification Group Services and System Aspects; Charging Implications of IMS architecture (Release 5); 3GPP Draft; 23815-100, 3rd Generation Partnership Project (3GPP), Mobile Competence Centre; 650, Route des Lucioles; F-06921 Sophia-Antipolis Cedex; France; vol. tsg_sa/TSG_SA/TSGS_14/Docs/ZIP, No. Kyoto, Japan; (Dec. 11, 2001), XP050195892.
Orange: Message Sequence Chart for IOI: 3GPP Draft; S5-054518 Message Sequence Chart for IOI, 3rd Generation Partnership Project (3GPP), Mobile Competence Centre; 650, Route des Lucioles; F-06921 Sophia-Antipolis Cedex; France; vol. tsg_sa/WG5_TM/TSGS5_42bis/Docs, No. Sophia Antipolis, France; (Jun. 15, 2005), XP050301535.

* cited by examiner

*Primary Examiner* — Stephen M D'Agosta
(74) *Attorney, Agent, or Firm* — Duft, Bornsen & Fishman, LLP

(57) ABSTRACT

Communication networks and methods are disclosed for sharing charging information between a home IMS network and a visited IMS network. If a signaling message for a session is received in the visited IMS network, the visited IMS network assigns a visited charging identifier (e.g., ICID), and shares the visited charging identifier with the home IMS network through signaling messages. Similarly, the home IMS network assigns a home charging identifier, and shares the home charging identifier with the visited IMS network through signaling messages. When CDRs are generated in the home IMS network and the visited IMS network, the networks include the home charging identifier and the visited charging identifier in the CDRs so that billing systems may more easily correlate the CDRs from the different IMS networks.

12 Claims, 8 Drawing Sheets

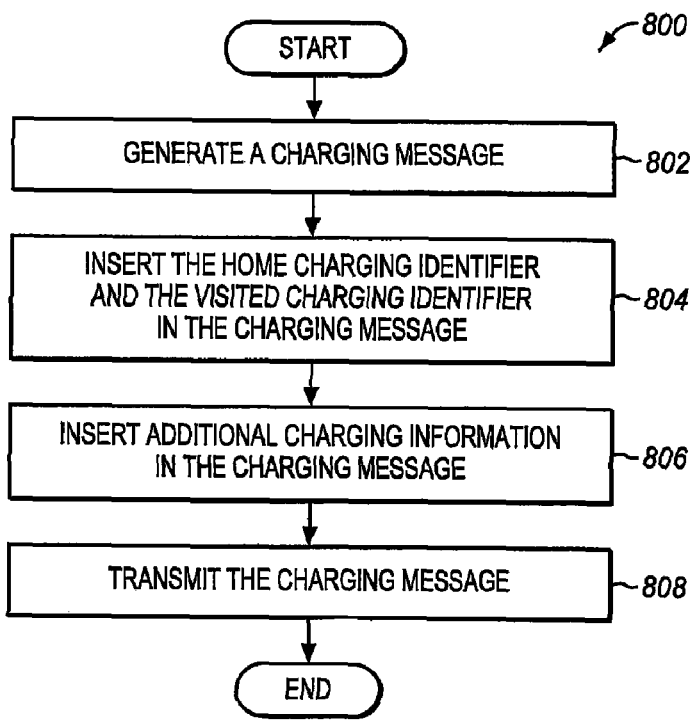
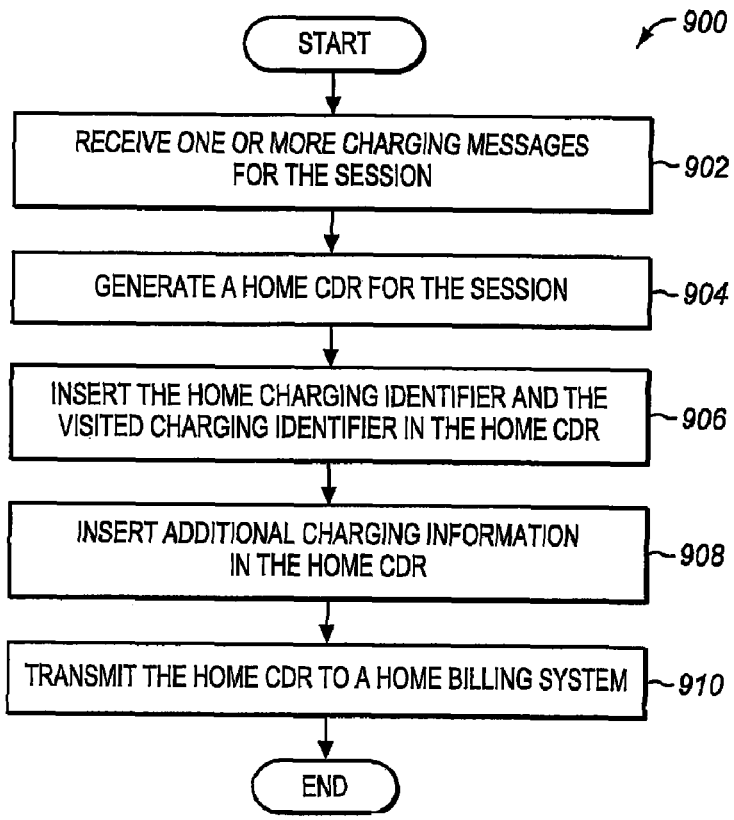

CHARGING FOR ROAMING USERS IN IMS NETWORKS

BACKGROUND OF THE INVENTION

1. Field of the Invention

The invention is related to the field of communication networks and, in particular, to providing for improved charging for roaming users in IMS networks.

2. Statement of the Problem

Mobile communications allows for the situation where a mobile user is roaming. Roaming is a general term in mobile communications that refers to the extending of service in a location that is different from the home location where the service was registered. The term "roaming" originates from the GSM world where roaming is defined as the ability for a cellular customer to automatically make and receive voice calls, send and receive data, or access other services when traveling outside the geographical coverage area of the home network by means of using a visited network.

If a mobile user roams into a visited cellular network, such as a GSM network or a CDMA network, the Mobile Switching Center (MSC) in the visited cellular network serves calls for the roaming user. If a call is placed by the roaming user, the serving MSC collects charging information for the call, and generates a Charging Detail Record (CDR). The serving MSC then transmits the CDR to a billing system in the visited cellular network. The billing system then resolves the proper billing for the call. The billing system in the visited cellular network will also settle the billing with a billing system in the home cellular network based on an agreement between the two service providers. In a CDMA network, the billing systems use Cellular Intercarrier Billing Exchange Roamer (CIBER) to exchange charging information. In a GSM network, the billing systems use Transferred Account Procedure (TAP) to exchange charging information. When the billing is settled, the visited cellular network and the home cellular network will typically share revenues from the call.

One type of communication network gaining popularity is an IP Multimedia Subsystem (IMS) network. As set forth in the $3^{rd}$ Generation Partnership Project (3GPP), IMS provides a common core network having a network architecture that allows for various types of access networks. The access network between a communication device and the IMS network may be a cellular network (e.g., CDMA or GSM), a WLAN (e.g., WiFi or WiMAX), an Ethernet network, or another type of wireless or wireline access network. The IMS architecture is initially defined by the 3GPP to provide multimedia services to communication devices over an Internet Protocol (IP) network, as IP networks have become the most cost savings bearer network to transmit video, voice, and data. Service providers are accepting this architecture in next generation network evolution.

Before a communication device receives service from an IMS network, the communication device attempts to register with the IMS network. To register according to 3GPP standards, the communication device transmits a register request message, such as a SIP REGISTER message, to a Proxy-Call Session Control Function (P-CSCF) through the appropriate access network. The P-CSCF identifies the home IMS network for the communication device, and then transmits another register request message to a Serving-Call Session Control Function (S-CSCF) in the home IMS network of the user. Responsive to the register request message, the S-CSCF generates an authentication request message, such as a Diameter Multimedia Authentication Request (MAR) message to retrieve the communication device's authentication data. The S-CSCF then authenticates the communication device using the appropriate authentication method. If the communication device is authenticated, then the S-CSCF generates a subscriber profile request message, such as a Diameter Server Assignment Request (SAR) message, and transmits the subscriber profile request message to the HSS. Responsive to the subscriber profile request message, the HSS identifies the subscriber profile for the user of the communication device. The HSS then transmits a response message, such as a Diameter Server Assignment Answer (SAA) message, to the S-CSCF that includes the subscriber profile for the user of the communication device. The S-CSCF may then process the subscriber profile to provide services for the communication device.

When a mobile user is roaming in the service area of a visited IMS network, the visited IMS network does not provide call control for sessions. If a roaming session is initiated, then the P-CSCF in the visited IMS network receives a session initiation message for the session (e.g., SIP INVITE message). The P-CSCF proxies the session control for the session to the S-CSCF in the home IMS network of the mobile user by forwarding the session initiation message to the S-CSCF. The S-CSCF in the home IMS network then provides session control for the session.

While providing session control, the S-CSCF in the home IMS network also provides charging control. At session initiation, the S-CSCF generates a home IMS Charging Identifier (ICID) for the session. The S-CSCF also transmits a start charging message, such as a Diameter Accounting Request (ACR[start]) message, to a Charging Data Function (CDF) in the home IMS network. Periodically during the session, the S-CSCF transmits interim charging messages, such as a Diameter ACR[interim] messages, to the CDF in the home IMS network. At the end of the session, the S-CSCF transmits a stop charging message, such as a Diameter ACR[stop] message, to the CDF in the home IMS network. The ACR messages all include the home ICID for the session so that the ACR messages may be correlated.

Based on the ACR[start,interim,stop] messages received from the S-CSCF, the CDF generates a Charging Data Record (CDR) for the session based on charging information included in the ACR messages. The charging information may include a service delivery start timestamp for the session, a service delivery stop timestamp for the session, a destination for the session, etc. The CDF then transmits the CDR to a billing system in the home IMS network. The billing system may then resolve any charging for the session based on the CDRs.

The P-CSCF in the visited IMS network may also provide some charging control for the session. The P-CSCF generates a visited IMS Charging Identifier (ICID) for the session. If the P-CSCF generates charging messages for the session, such as Diameter ACR[start,interim,stop] messages, then the P-CSCF transmits the ACR messages to a CDF in the visited IMS network. The ACR messages all include the visited ICID for the session so that the ACR messages may be correlated.

Based on the ACR[start,interim,stop] messages received from the P-CSCF, the CDF in the visited IMS network generates a CDR for the session based on charging information included in the ACR messages. The CDF then transmits the CDR to a billing system in the visited IMS network. The billing system may then resolve any charging for the session based on the CDRs.

One problem in present IMS networks is that there is no effective way to correlate charging information from a home IMS network and a visited IMS network. The S-CSCF in the home IMS network generates its own unique home ICID while the P-CSCF in the visited IMS network generates another unique visited ICID for the same session. Thus, the billing system in the home IMS network identifies the session based on a home ICID while the billing system in the visited IMS network identifies the same session based a visited ICID. Because of the different ICIDs for the same session, it is difficult for the two billing systems to correlate charging information generated in each IMS network and to settle a bill on the session.

Another problem with present IMS networks is that the P-CSCF in the visited IMS network may not be in the session at all, or may not have the appropriate or necessary charging information for the session. Because session control is being provided in the home IMS network, the home IMS network has the necessary charging information for the session. The P-CSCF may have some charging information, but may not have the necessary information to provide to the CDF to allow the CDF to generate a full CDR. As a result, the billing system in the visited IMS network may not be able to calculate a bill for the session. The service provider operating the visited IMS network has to rely on the billing system of the home IMS network to share the proper revenues for the session according to agreements in place. The service provider operating the visited IMS network unfortunately may not be able to verify the billing of the home IMS network or determine whether the home IMS network is sharing the appropriate revenues.

SUMMARY OF THE SOLUTION

Embodiments of the invention solve the above and other related problems by having the home IMS network and the visited IMS network share charging identifiers, such as ICIDs, with each other that are assigned to the session. For instance, the home IMS network assigns a home charging identifier to a session, and shares the home charging identifier with the visited IMS network. Similarly, the visited IMS network assigns a visited charging identifier to the session, and shares the visited charging identifier with the home IMS network. The home IMS network and the visited IMS network may then each insert the home charging identifier and the visited charging identifier in CDRs so that CDRs in the home IMS network may be correlated with CDRs in the visited IMS network according to the charging identifiers. The billing systems in these IMS networks can thus settle billing for the session in an easier manner.

Further, the home IMS network and the visited IMS network may share or exchange additional charging information for a session. Thus, both the home IMS network and the visited IMS network will have the proper information to generate a full CDR for the session. The visited IMS network will advantageously be able to verify the billing calculated by the home billing system, and vice versa.

In one embodiment, a visited IMS network includes a visited network element (e.g., a P-CSCF) and a visited charging data system (e.g., a CDF). The visited network element is adapted to receive a signaling message for a session, and assign a visited charging identifier for the session. One example of a visited charging identifier is a visited ICID. The visited network element is further adapted to insert the visited charging identifier in the signaling message, and transmit the signaling message to a home IMS network. Responsive to receiving the signaling message, a network element in the home IMS network is adapted to process the signaling message to identify the visited charging identifier, and store the visited charging identifier.

In a similar manner, the home IMS network includes a home network element (e.g., an S-CSCF) and a home charging data system (e.g., a CDF). The home network element is adapted to receive a signaling message for the session, and assign a home charging identifier for the session. The home network element is further adapted to insert the home charging identifier in the signaling message, and transmit the signaling message to the visited IMS network. Responsive to receiving the signaling message, the visited network element is adapted to process the signaling message to identify the home charging identifier, and store the home charging identifier.

When charging is appropriate for the session, the visited network element is adapted to generate a charging message for the session, such as a Diameter Accounting Request (ACR) message. The visited network element is further adapted to insert the home charging identifier and the visited charging identifier in the charging message, and transmit the charging message to the visited charging data system. The visited charging data system is adapted to generate a visited CDR for the session, insert the home charging identifier and the visited charging identifier in the visited CDR, and to transmit the visited CDR to a billing system in the visited IMS network.

When charging is appropriate for the session in the home IMS network, the home network element is adapted to generate a charging message for the session. The home network element is further adapted to insert the home charging identifier and the visited charging identifier in the charging message, and transmit the charging message to the home charging data system. The home charging data system is adapted to generate a home CDR for the session, insert the home charging identifier and the visited charging identifier in the home CDR, and to transmit the home CDR to a billing system in the home IMS network.

Based on the home charging identifier and the visited charging identifier included in the home CDR and the visited. CDR, the billing systems in the home IMS network and the visited IMS network may effectively correlate the CDRs for the session. As a result, more accurate charging may be realized for the session.

The invention may include other exemplary embodiments described below.

DESCRIPTION OF THE DRAWINGS

The same reference number represents the same element or same type of element on all drawings.

FIG. 8 is a flow chart illustrating a method of generating a charging message in a home IMS network in an exemplary embodiment of the invention.

FIG. 9 is a flow chart illustrating a method of generating a CDR in a home IMS network in an exemplary embodiment of the invention.

DETAILED DESCRIPTION OF THE INVENTION

FIGS. 1-13 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
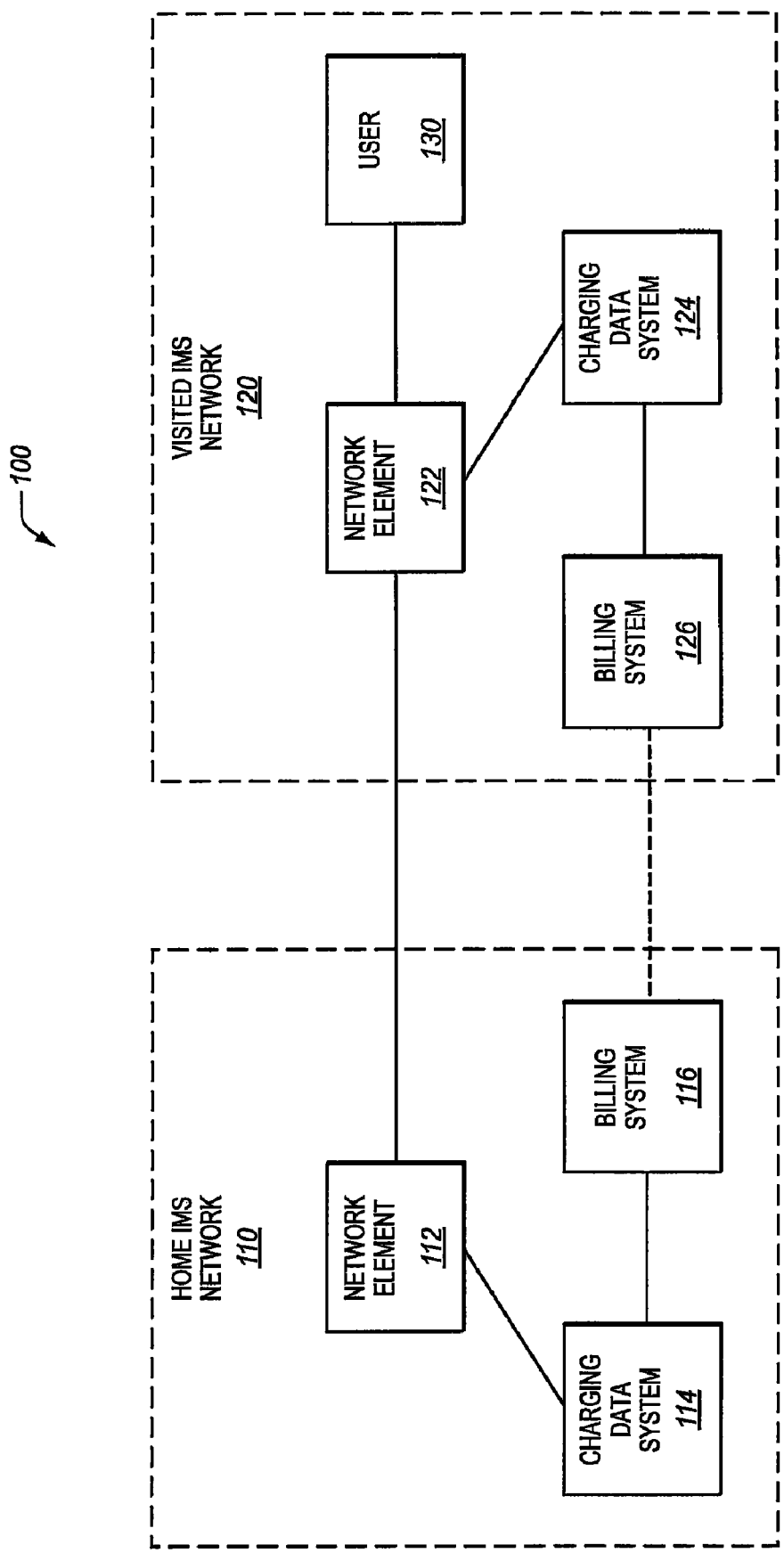
FIG. 1 illustrates a communication network in an exemplary embodiment of the invention.

FIG. 1 illustrates a communication network 100 in an exemplary embodiment of the invention. Communication network 100 includes a home IMS network 110 and a visited IMS network 120. A home IMS network comprises the IMS network where service is registered or subscribed to by a particular user. A visited IMS network comprises an IMS network where service is not registered or subscribed to by a particular user but is extending service to the user while the user is roaming.

Home IMS network 110 includes a home network element 112, a home charging data system 114, and a home billing system 116. Network element 112 comprises any system, server, or function adapted to provide session control or service for a session in home IMS network 110. An example of network element 112 includes a Serving-Call Session Control Function (S-CSCF). Charging data system 114 comprises any system, server, or function adapted to receive charging messages from network element 112, and to generate Charging Data Records (CDR) for sessions in home IMS network 110. For example, charging data system 114 may comprise a Charging Data Function (CDF) as defined by the 3GPP in Release 6, or a Charging Collector Function (CCF) as defined by the 3GPP in Release 5. Billing system 116 comprises any system, server, or function adapted to process CDRs to generate or resolve a bill for a session in home IMS network 110.

Visited IMS network 120 includes a visited network element 122, a visited charging data system 124, and a visited billing system 126. Network element 122 comprises any system, server, or function adapted to provide session control or service for a session in visited IMS network 120. An example of network element 122 includes a Proxy-Call Session Control Function (P-CSCF). Charging data system 124 comprises any system, server, or function adapted to receive charging messages from network element 122, and to generate Charging Data Records (CDR) for sessions in visited IMS network 120. Billing system 126 comprises any system, server, or function adapted to process CDRs to generate or resolve a bill for a session in visited IMS network 120.

In this embodiment, assume that an IMS user 130 registers or subscribes to service with home IMS network 110, but is roaming in visited IMS network 120. User 130 has properly-equipped communication device or user equipment (UE) for communication. Also assume that user 130 initiates or is invited into a session while roaming in visited IMS network 120. According to the embodiments described herein, home IMS network 110 exchanges or shares charging identifiers, such as IMS Charging Identifiers (ICID), with visited IMS network 120, so that CDRs from home IMS network 110 and visited IMS network 120 may be correlated with one another to settle billing for the session. Home IMS network 110 and visited IMS network 120 may also exchange or share additional charging information so that both IMS networks 110 and 120 will have the necessary charging information to generate full CDRs for the session. That way, one IMS network can verify the billing of the other IMS network. The operation of the IMS networks 110 and 120 is described in the following flow charts.

Figure 2:
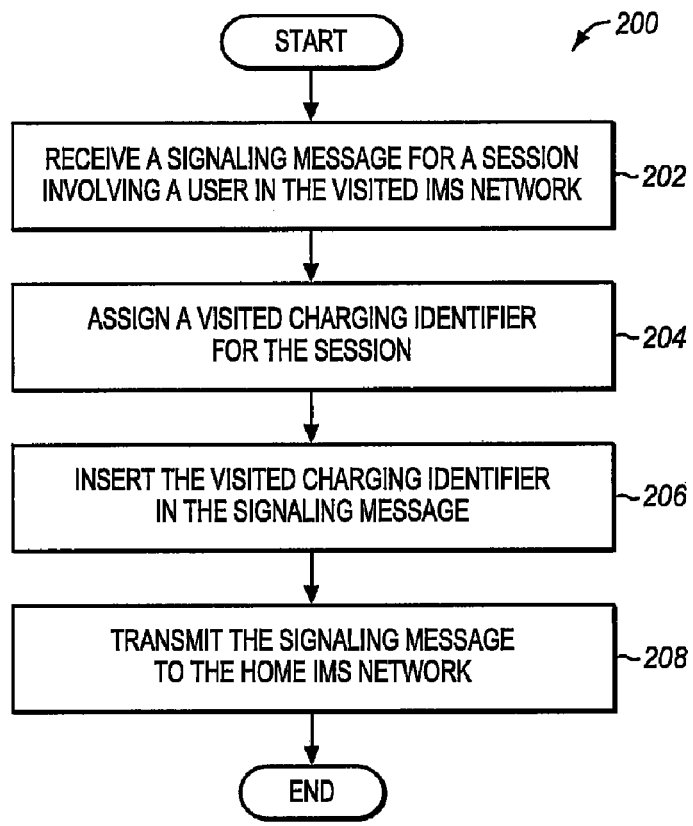
FIG. 2 is a flow chart illustrating a method of sharing an ICID of a visited IMS network with a home IMS network in an exemplary embodiment of the invention.

FIG. 2 is a flow chart illustrating a method 200 of sharing a charging identifier of visited IMS network 120 with home IMS network 110 in an exemplary embodiment of the invention. The steps of method 200 will be described with reference to communication network 100 in FIG. 1. The steps of the flow chart in FIG. 2 are not all inclusive and may include other steps not shown.

In step 202 of method 200, network element 122 in visited IMS network 120 receives a signaling message for a session involving user 130. As an example, network element 122 may receive a SIP INVITE message for the session being initiated by user 130. In step 204, network element 122 assigns a visited charging identifier for the session. A visited charging identifier comprises any number, code, string, etc, that is assigned in visited IMS network 120 and used in visited IMS network 120 to correlate charging information for the session. An example of a visited charging identifier is a visited IMS Charging Identifier (ICID). In step 206, network element 122 inserts the visited charging identifier in the signaling message. To insert the visited charging identifier in a SIP message for example, a new AVP may be defined in the P-Charging-Vector of the SIP message for the visited charging identifier. Network element 122 may then insert the visited charging identifier in the new AVP of the SIP message. Network element 122 may insert the visited charging identifier in the same signaling message received in step 202, or may generate another signaling message. As an example, network element 122 may generate a new SIP INVITE message for the session, and insert the visited charging identifier in the new INVITE message. In step 208, network element 122 transmits the signaling message to network element 112 in home IMS network 110.

Figure 3:
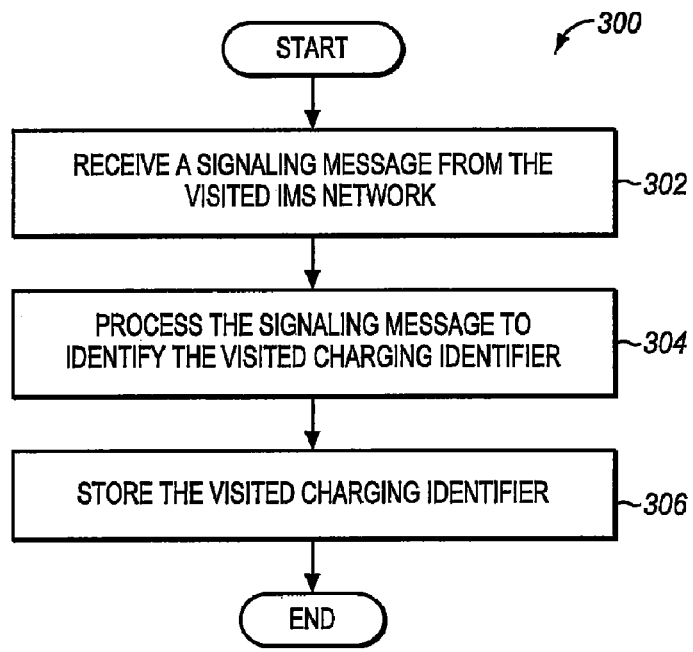
FIG. 3 is a flow chart illustrating a method of processing a visited ICID in a home IMS network in an exemplary embodiment of the invention.

FIG. 3 is a flow chart illustrating a method 300 of processing the visited charging identifier in home IMS network 110 in an exemplary embodiment of the invention. The steps of method 300 will be described with reference to communication network 100 in FIG. 1. The steps of the flow chart in FIG. 3 are not all inclusive and may include other steps not shown.

In step 302 of method 300, network element 112 receives the signaling message from network element 122. In step 304, network element 112 processes the signaling message to identify the visited charging identifier inserted in the signaling message. As an example, network element 112 may process the P-Charging-Vector in a SIP message to identify the visited charging identifier. In step 306, network element 112 stores the visited charging identifier for the session for later use in generating charging messages for the session.

Figure 4:
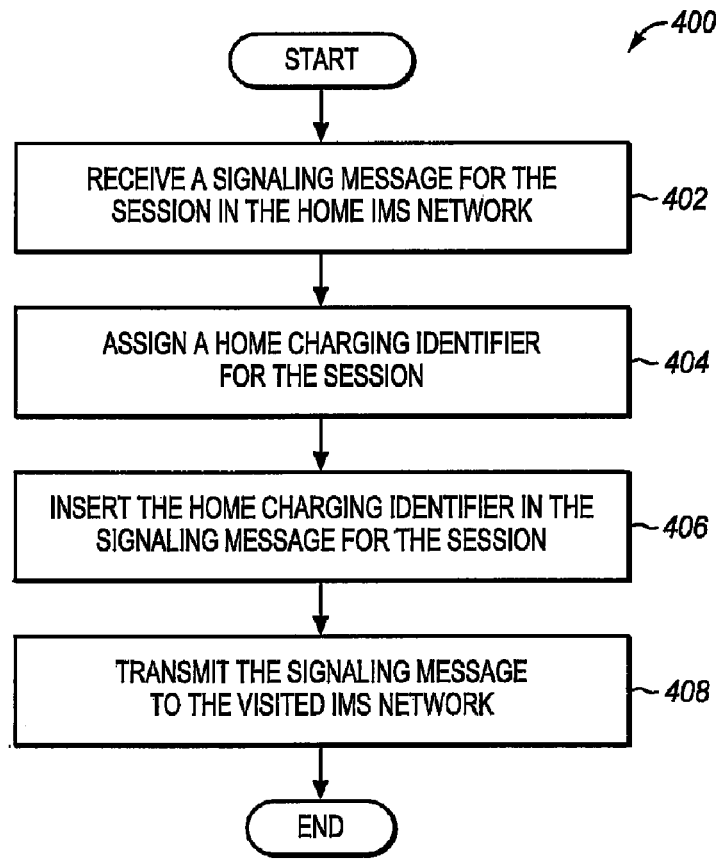
FIG. 4 is a flow chart illustrating a method of sharing a home charging identifier of a home IMS network with a visited IMS network in an exemplary embodiment of the invention.

In a similar manner, home IMS network 110 shares a home charging identifier with visited IMS network 120. FIG. 4 is a flow chart illustrating a method 400 of sharing a home charging identifier of home IMS network 110 with visited IMS network 120 in an exemplary embodiment of the invention. The steps of method 400 will be described with reference to communication network 100 in FIG. 1. The steps of the flow chart in FIG. 4 are not all inclusive and may include other steps not shown.

In step 402 of FIG. 4, network element 112 receives a signaling message for the session. For instance, network element 112 may receive the signaling message from visited IMS network 120, such as in step 302 of FIG. 3, and network element 112 is thus able to identify that a session is being initiated for user 130. In step 404, network element 112 assigns a home charging identifier for the session. A home charging identifier comprises any number, code, string, etc, that is assigned in home IMS network 110 and used in home IMS network 110 to correlate charging information for the session. An example of a home charging identifier is a home IMS Charging Identifier (ICID). In this embodiment, network element 112 may re-use the visited charging identifier as the home charging identifier, or may generate a unique home charging identifier. In step 406, network element 112 inserts the home charging identifier in a signaling message for the session. Again, to insert the home charging identifier in a SIP message for example, a new AVP may be defined in the P-Charging-Vector of the SIP message for the home charging identifier. Network element 112 may then insert the home charging identifier in the new AVP of the SIP message. In step 408, network element 112 transmits the signaling message to network element 122 in visited IMS network 120.

Figure 5:
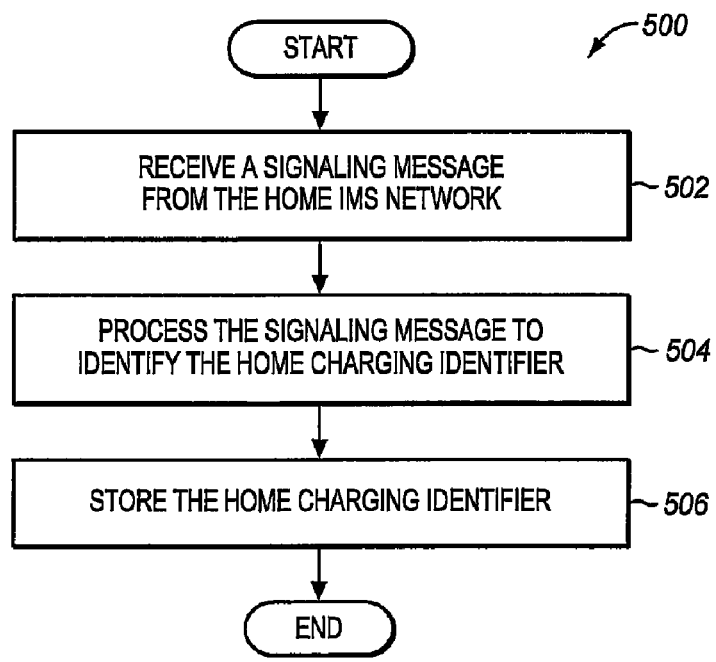
FIG. 5 is a flow chart illustrating a method of processing a home charging identifier in a visited IMS network in an exemplary embodiment of the invention.

FIG. 5 is a flow chart illustrating a method 500 of processing the home charging identifier in visited IMS network 120 in an exemplary embodiment of the invention. The steps of method 500 will be described with reference to communication network 100 in FIG. 1. The steps of the flow chart in FIG. 5 are not all inclusive and may include other steps not shown.

In step 502 of method 500, network element 122 receives the signaling message from network element 112. In step 504, network element 122 processes the signaling message to identify the home charging identifier inserted in the signaling message. As an example, network element 122 may process the P-Charging-Vector in a SIP message to identify the home charging identifier. In step 506, network element 122 stores the home charging identifier for the session for later use in generating charging messages for the session.

Figure 6:
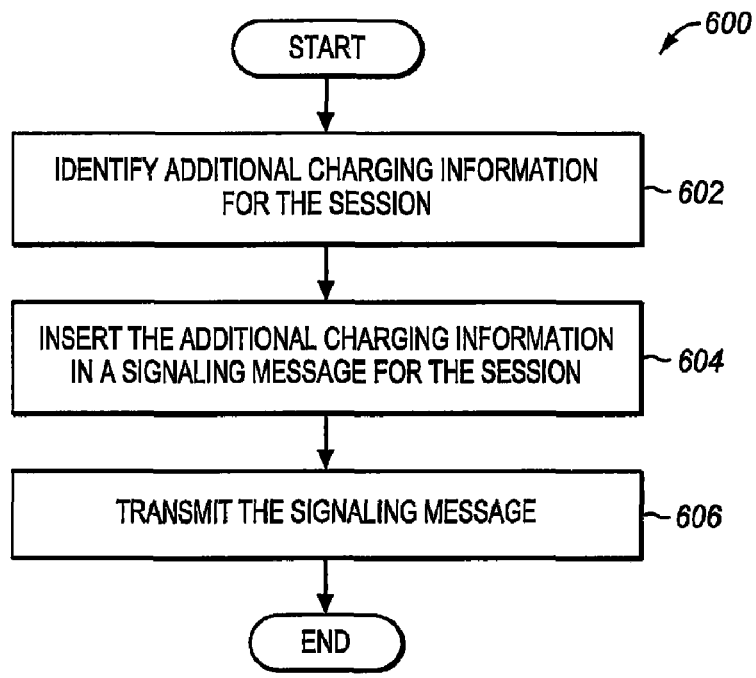
FIG. 6 is a flow chart illustrating a method of sharing additional charging information in an exemplary embodiment of the invention.
Figure 7:
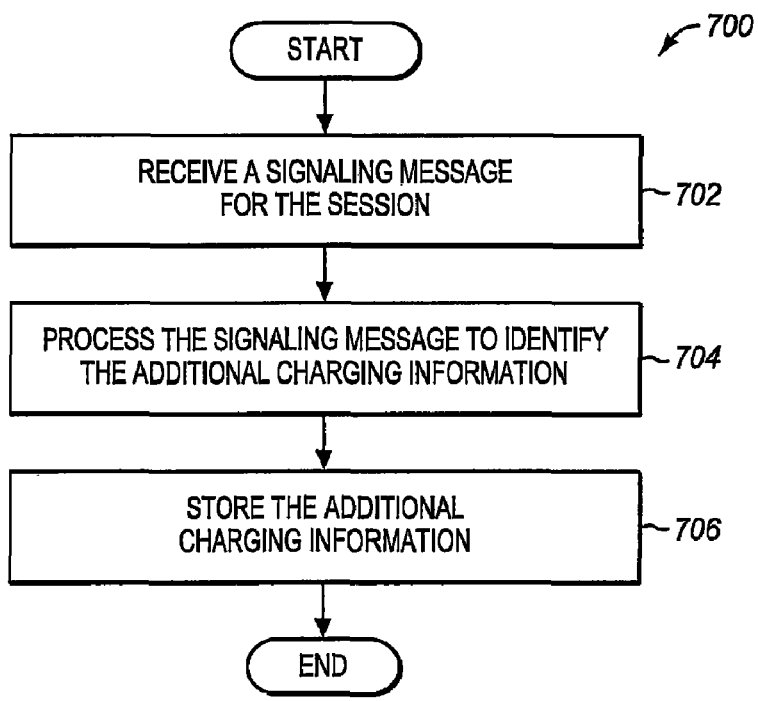
FIG. 7 is a flow chart illustrating another method of sharing additional charging information in an exemplary embodiment of the invention.

The above flow charts illustrate sharing of a home charging identifier and a visited charging identifier between home IMS network 110 and visited IMS network 120. In addition to sharing the charging identifiers, home IMS network 110 and visited IMS network 120 may further share additional charging information. Additional charging information refers to any information other than a charging identifier that is generated in an IMS network and used for charging purposes. FIGS. 6-7 illustrate methods of sharing the additional charging information.

FIG. 6 is a flow chart illustrating a method 600 of sharing additional charging information in an exemplary embodiment of the invention. The steps of method 600 will be described with reference to communication network 100 in FIG. 1. The steps of the flow chart in FIG. 6 are not all inclusive and may include other steps not shown.

In step 602 of method 600, network element 122 identifies additional charging information for the session. One example of additional charging information comprises service delivery timestamps that are generated for the session in visited IMS network 120. Other examples of additional charging information are provided below. In step 604, network element 122 inserts the additional charging information in a signaling message for the session. To insert the additional charging information in a SIP message for example, a new AVP may be defined in the P-Charging-Vector of the SIP message for the additional charging information. Network element 122 may then insert the additional charging information in the new AVP of the SIP message. Network element 122 may insert the additional charging information in the same signaling message as the visited charging identifier as in step 204 of FIG. 2. In step 608, network element 122 transmits the signaling message to network element 112 in home IMS network 110.

FIG. 7 is a flow chart illustrating another method 700 of sharing additional charging information in an exemplary embodiment of the invention. The steps of method 700 will be described with reference to communication network 100 in FIG. 1. The steps of the flow chart in FIG. 7 are not all inclusive and may include other steps not shown.

In step 702 of method 700, network element 112 receives the signaling message from network element 122. In step 704, network element 112 processes the signaling message to identify the additional charging information inserted in the signaling message. In step 706, network element 112 stores the additional charging information for the session for later use in generating charging messages for the session.

The same methods of FIGS. 6-7 may be used to share additional charging information between home IMS network 110 and visited IMS network 120. The following provides some examples of sharing additional charging information. In one example, assume that network element 122 receives a signaling message for the session that includes an Access Network Charging Identifier (ANCID) for the session. The access network used by user 130 in FIG. 1 may comprise a WiFi network, a cellular network, etc, that may additionally charge for the session. The ANCID is used to correlate the access network charging data with IMS charging data for the session. When user 130 is roaming and gaining access through an access network associated with visited IMS network 120, home IMS network 110 may not be able to identify the ANCID for the session. According to the embodiment in FIGS. 6-7, when network element 122 receives a signaling message for the session, the signaling message may include the ANCID for the session. Thus, network element 122 may identify the ANCID in the signaling message (see step 602), insert the ANCID in a signaling message destined for home IMS network 110 (see step 604), and transmit the signaling message to home IMS network 110 (see step 606). Network element 112 in home IMS network 110 may then receive the signaling message (see step 702), process the signaling message to identify the ANCID (see step 704), and store the ANCID (see step 706).

In another example, home IMS network 110 and visited IMS network 120 may share IMS user session identifiers. Upon initiation of a session, both home IMS network 110 and visited IMS network 120 generate a unique IMS user session identifier for the session. This is in addition to the ICID. According to the embodiment in FIGS. 6-7, home IMS network 110 and visited IMS network 120 may share their respective IMS user session IDs through signaling messages.

In another example, home IMS network 110 and visited IMS network 120 may share inter-operator identifiers (IOI). The IOIs define the originating and terminating networks for the session. Home IMS network 110 and visited IMS network 120 may thus share IOIs through signaling messages.

In another example, home IMS network 110 and visited IMS network 120 may share service delivery timestamps for the session. If network element 122 in visited IMS network 120 generates an initial charging message for the session, such as a Diameter ACR[start] message, then network element 122 generates a service delivery start timestamp. Also, if network element 122 generates a final charging message for the session, such as a Diameter ACR[stop] message, then network element 122 generates a service delivery stop timestamp. Network element 112 in home IMS network 110 generates similar service delivery timestamps for charging messages. When these and other timestamps are generated, home IMS network 110 and visited IMS network 120 may share these timestamps through signaling messages. Home IMS network 110 and visited IMS network 120 may share other charging information, such as an IP address of user 130, an indication that user 130 is roaming, an access gateway (GGSN/SGSN) address, etc.

At some point while serving the session, network element 112 and network element 122 may generate a charging message for the session, such as a Diameter ACR message. FIG. 8 is a flow chart illustrating a method 800 of generating a charging message in home IMS network 110 in an exemplary embodiment of the invention. The steps of method 800 will be described with reference to communication network 100 in FIG. 1. The steps of the flow chart in FIG. 8 are not all inclusive and may include other steps not shown.

In step 802 of method 800, network element 112 generates the charging message for the session. A conventional network element in home IMS network 110 would insert the home charging identifier, such as the home ICID, in the charging message, and other charging information that is generated in home IMS network 110. According to method 800, network element 112 inserts the home charging identifier in the charging message, and also inserts the visited charging identifier as assigned by visited IMS network 120 in the charging message in step 804. To insert the home charging identifier and the visited charging identifier in a Diameter ACR message for example, new AVPs may be defined in the ACR message for the home charging identifier and the visited charging identifier. Network element 122 may then insert the home charging identifier and the visited charging identifier in the new AVPs of the ACR message.

If network element 112 re-used the visited charging identifier for the home charging identifier, then obviously only the visited charging identifier is inserted in the charging message as it represents both the visited charging identifier and the home charging identifier. If network element 112 assigned a unique home charging identifier for the session instead of re-using the visited charging identifier, then network element 112 will insert both the home charging identifier and the visited charging identifier in the charging message. Method 800 may also include the optional step of inserting additional charging information for the session as provided by visited IMS network 120 in the charging message in step 806. Network element 112 then transmits the charging message to charging data system 114 in step 808.

FIG. 9 is a flow chart illustrating a method 900 of generating a CDR in home IMS network 110 in an exemplary embodiment of the invention. The steps of method 900 will be described with reference to communication network 100 in FIG. 1. The steps of the flow chart in FIG. 9 are not all inclusive and may include other steps not shown.

In step 902 of method 900, charging data system 114 receives one or more charging messages from network element 112. Charging data system 114 may additionally receive charging messages from other network elements not shown in FIG. 1. Charging data system 114 then generates a home CDR for the session in step 904. A conventional charging data system in home IMS network 110 would insert the home charging identifier in the home CDR, and other charging information that is generated in home IMS network 110. According to method 900, charging data system 114 inserts the home charging identifier in the home CDR, and also inserts the visited charging identifier as assigned by visited IMS network 120 in the home CDR in step 906. To insert the home charging identifier and the visited charging identifier in the home CDR for example, new fields may be defined in the CDR for these charging identifiers. Charging data system 114 may then insert the home charging identifier and the visited charging identifier in the new fields of the home CDR. Method 900 may also include the optional step of inserting additional charging information for the session as provided by visited IMS network 120 in the home CDR in step 908. Charging data system 114 then transmits the home CDR to billing system 116 in step 910.

Figure 10:
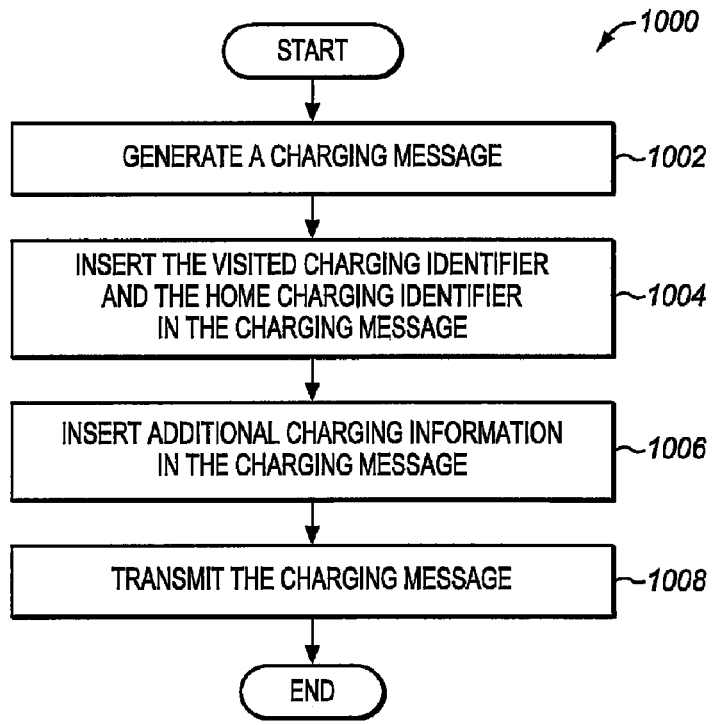
FIG. 10 is a flow chart illustrating a method of generating a charging message in a visited IMS network in an exemplary embodiment of the invention.

FIG. 10 is a flow chart illustrating a method 1000 of generating a charging message in visited IMS network 120 in an exemplary embodiment of the invention. The steps of method 1000 will be described with reference to communication network 100 in FIG. 1. The steps of the flow chart in FIG. 10 are not all inclusive and may include other steps not shown.

In step 1002 of method 1000, network element 122 generates a charging message for the session. A conventional network element in visited IMS network 120 would insert the visited charging identifier message, such as the visited ICID, in the charging message, and other charging information that is generated in visited IMS network 120. According to method 1000, network element 122 inserts the visited charging identifier in the charging message, and also inserts the home charging identifier as assigned by home IMS network 110 in the charging message in step 1004. Method 1000 may also include the optional step of inserting additional charging information for the session as provided by home IMS network 110 in the charging message in step 1006. Network element 122 then transmits the charging message to charging data system 124 in step 1008.

Figure 11:
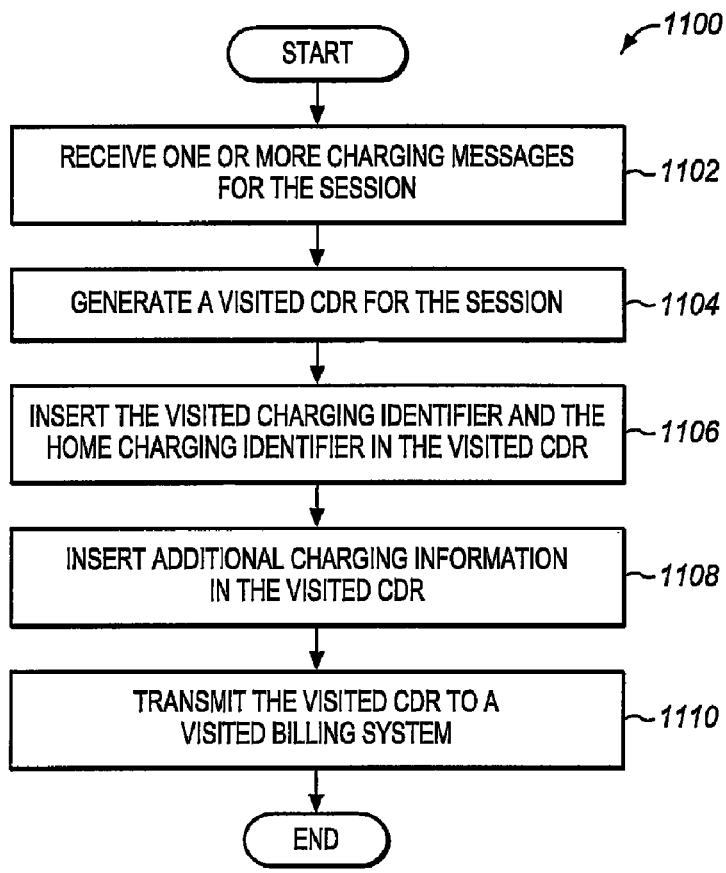
FIG. 11 is a flow chart illustrating a method of generating a CDR in a visited IMS network in an exemplary embodiment of the invention.

FIG. 11 is a flow chart illustrating a method 1100 of generating a CDR in visited IMS network 120 in an exemplary embodiment of the invention. The steps of method 1100 will be described with reference to communication network 100 in FIG. 1. The steps of the flow chart in FIG. 11 are not all inclusive and may include other steps not shown.

In step 1102 of method 1100, charging data system 124 receives one or more charging messages from network element 122. Charging data system 124 may additionally receive charging messages from other network elements not shown in FIG. 1. Charging data system 124 generates a visited CDR for the session in step 1104. Charging data system 124 then inserts the visited charging identifier in the visited CDR, and also inserts the home charging identifier as assigned by home IMS network 110 in the visited CDR in step 1106. Method 1100 may also include the optional step of inserting additional charging information for the session as provided by home IMS network 110 in the visited CDR in step 1108. Charging data system 124 then transmits the visited CDR to billing system 126 in step 1110.

In FIG. 1, billing system 116 in home IMS network 110 receives one or more home CDRs from charging data system 114. Billing system 126 in visited IMS network 120 also receives one or more visited CDRs from charging data system 124. Because the home CDRs in home IMS network 110 and the visited CDRs in visited IMS network 120 include the same charging identifiers (e.g., both the home charging identifier and the visited charging identifier) and additional shared charging information, billing system 116 and billing system 126 may advantageously correlate CDRs generated in both home IMS network 110 and visited IMS network 120. As a result, more accurate charging may be realized for the session. Also, because home IMS network 110 and visited IMS network 120 may share additional charging information, each billing system 116 and 126 is able to verify charging by the other billing system for the session.

Example

Figure 12:
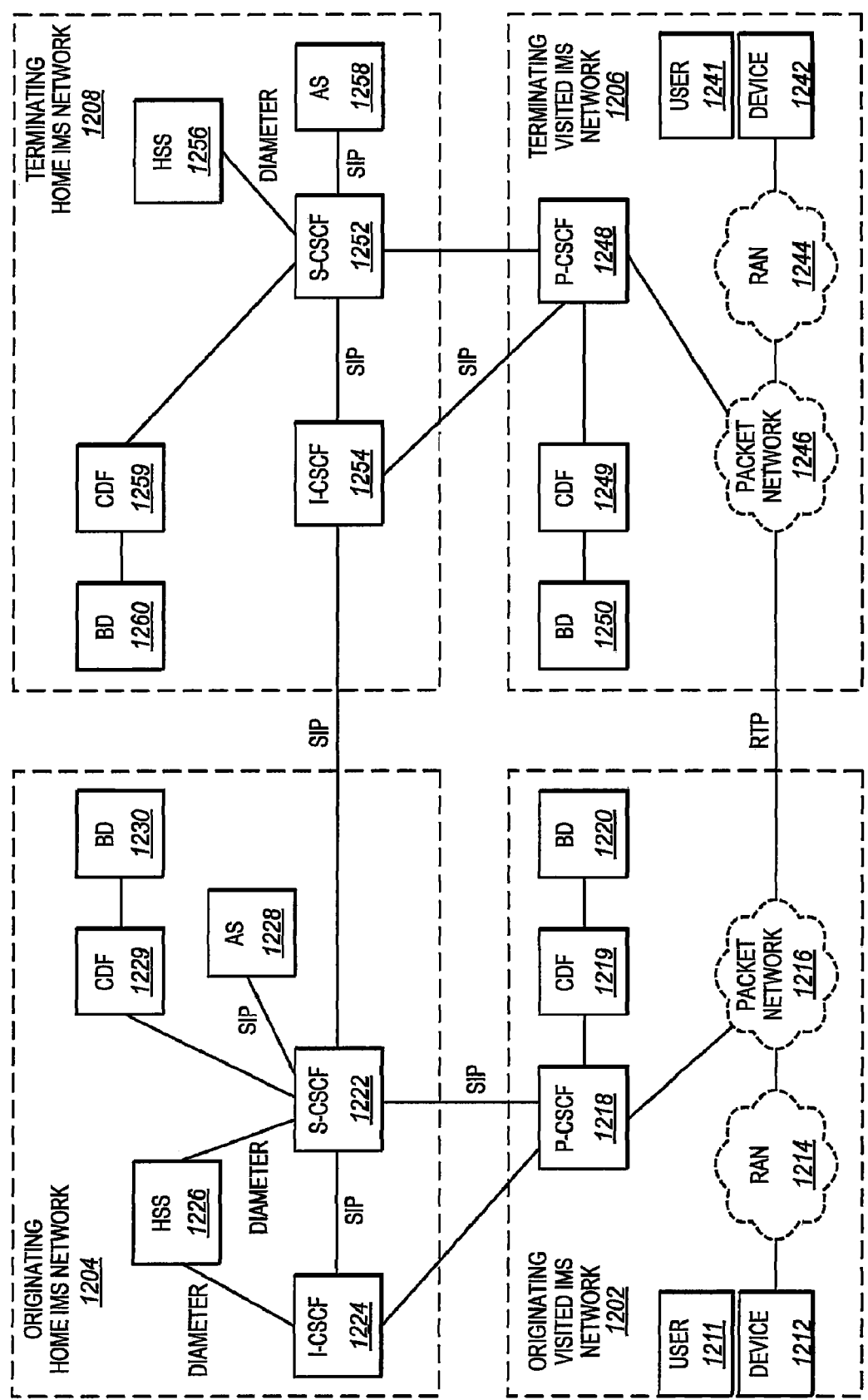
FIG. 12 illustrates another communication network in an exemplary embodiment of the invention.
Figure 13:
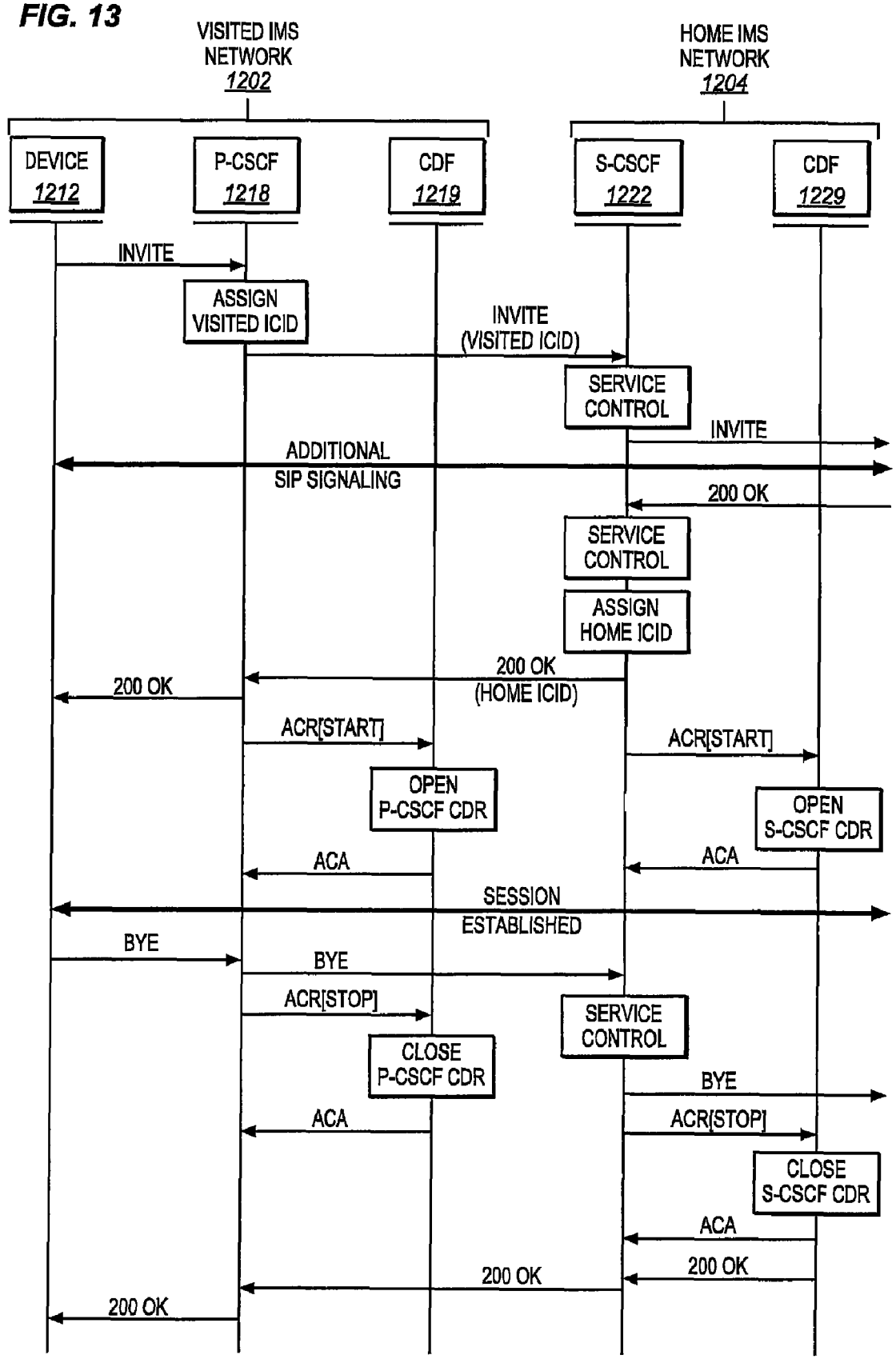
FIG. 13 is a message diagram illustrating the sharing of charging information between a home IMS network and a visited IMS network on an originating side of a session in an exemplary embodiment of the invention.

FIGS. 12-13 illustrate an example of sharing charging information between a home IMS network and a visited IMS network. FIG. 12 illustrates communication network 1200 in an exemplary embodiment of the invention. Communication network 1200 includes an originating visited IMS network 1202, an originating home IMS network 1204, a terminating visited IMS network 1206, and a terminating home IMS network 1208. Originating visited IMS network 1202 includes a mobile device 1212, a Radio Access Network (RAN) 1214, a packet network 1216, a P-CSCF 1218, a charging data function (CDF) 1219, and a billing domain (BD) 1220. Mobile device 1212 is being operated by user 1211. Originating home IMS network 1204 includes an S-CSCF 1222, an Interrogate-CSCF (I-CSCF) 1224, an HSS 1226, an application server (AS) 1228, a CDF 1229, and a billing domain (BD) 1230. Terminating visited IMS network 1206 includes a mobile device 1242, a RAN 1244, a packet network 1246, a P-CSCF 1248, a CDF 1249, and a billing domain (BD) 1250. Mobile device 1242 is being operated by user 1241. Terminating home IMS network 1208 includes an S-CSCF 1252, an I-CSCF 1254, an HSS 1256, an application server (AS) 1258, a CDF 1259, and a billing domain (BD) 1260. Communication network 1200 may include other nodes that are not illustrated in FIG. 12 for the sake of brevity.

FIG. 13 is a message diagram illustrating the sharing of charging information between a home IMS network and a visited IMS network on an originating side of a session in an exemplary embodiment of the invention. The message diagram illustrates SIP and Diameter messaging used within communication network 1200. Assume that user 1211 wants to initiate a session with user 1241. To initiate the session, mobile device 1212 generates a SIP INVITE message and transmits the INVITE message to P-CSCF 1218 through RAN 1214 and packet network 1216. Responsive to receiving the INVITE message, P-CSCF 1218 assigns a visited ICID for the session. P-CSCF 1218 may generate or identify additional charging information for the session, such as an ANCID, an IMS user session ID, IOIs, etc. P-CSCF 1218 then inserts the visited ICID and the additional charging information in the INVITE message. P-CSCF 1218 may insert the visited ICID and the additional charging information in a new AVP in the P-Charging-Vector of the SIP INVITE message. P-CSCF 1218 then transmits the INVITE message to S-CSCF 1222 in home IMS network 1204.

Responsive to the INVITE message, S-CSCF 1222 provides service control for the session. Also, S-CSCF 1222 processes the INVITE message to identify and store the visited ICID and additional charging information. S-CSCF 1222 then transmits the INVITE message to mobile device 1242 of user 1241 through home IMS network 1208 and visited IMS network 1206 (see FIG. 12). Because the embodiment is showing the sharing of charging information on the originating side of the session, the signaling messages on the terminating side of the session are left out for the sake of brevity.

To accept the session, mobile device 1242 transmits a SIP 200 OK message that is received by S-CSCF 1222. Responsive to the 200 OK message, S-CSCF 1222 assigns a home ICID for the session. S-CSCF 1222 may assign a new ICID that is unique from the visited ICID. Alternatively, S-CSCF 1222 may re-use the visited ICID assigned by visited IMS network 1202 as the home ICID. S-CSCF 1222 may also generate or identify additional charging information for the session, such as a home IMS user session ID, a home IOI, a service delivery start timestamp, etc. S-CSCF 1222 then inserts the home ICID and the additional charging information in the 200 OK message, and transmits the 200 OK message to P-CSCF 1218 in visited IMS network 1202.

Additionally, S-CSCF 1222 generates a Diameter Rf Accounting Request (ACR) [start] message for the beginning of the session. S-CSCF 1222 inserts the home ICID and the visited ICID in the ACR[start] message along with the additional charging information shared by visited IMS network 1202. S-CSCF 1222 then transmits the ACR[start] message to home CDF 1229 to record the start of a session and start of a media component in S-CSCF 1222. CDF 1229 processes the ACR[start] message to identify the home ICID, the visited ICID, and any additional charging information. CDF 1229 then opens an S-CSCF CDR for the session. CDF 1229 also responds to the ACR[start] message with a Diameter Accounting Answer (ACA) message.

P-CSCF 1218 receives the 200 OK message from S-CSCF 1222, and processes the 200 OK message to identify and store the home ICID and additional charging information. P-CSCF 1218 generates a Diameter Rf ACR[start] message for the beginning of the session. P-CSCF 1218 inserts the home ICID and the visited ICID in the ACR[start] message along with the additional charging information shared by home IMS network 1204. P-CSCF 1218 then transmits the ACR[start] message to visited CDF 1219 to record the start of a session and start of a media component in P-CSCF 1218. CDF 1219 processes the ACR[start] message to identify the home ICID, the visited ICID, and any additional charging information. CDF 1219 then opens a P-CSCF CDR for the session. CDF 1219 also responds to the ACR[start] message with a Diameter ACA message. The session is then established and user 1211 may communicate with user 1241.

At a later point, assume that user 1211 wants to end the session. To end the session, mobile device 1212 transmits a SIP BYE message to P-CSCF 1218. P-CSCF 1218 may again identify charging information for the session, and insert the charging information in the BYE message. P-CSCF 1218 then transmits the BYE message to S-CSCF 1222.

In further response to the BYE message, P-CSCF 1218 transmits an ACR[stop] to CDF 1219 to record the end of the session and stop of a media component in the P-CSCF CDR. CDF 1219 closes the P-CSCF CDR and also responds to P-CSCF 1218 with an ACA message. The P-CSCF CDR includes the home ICID, the visited ICID, and additional charging information that was shared by home IMS network 1204. CDF 1219 then transmits the P-CSCF CDR to billing domain 1220 (not shown in FIG. 13).

S-CSCF 1222 receives the BYE message from P-CSCF 1218. S-CSCF 1222 then transmits the BYE message to mobile device 1242 of user 1241 through home IMS network 1208 and visited IMS network 1206 (see FIG. 12). S-CSCF 1222 also transmits an ACR[stop] to CDF 1229 to record the end of the session and stop of a media component in the S-CSCF CDR. CDF 1229 closes the S-CSCF CDR and also responds to S-CSCF 1222 with an ACA message. The S-CSCF CDR includes the home ICID, the visited ICID, and additional charging information that was shared by visited IMS network 1202. CDF 1229 then transmits the S-CSCF CDR to billing domain 1230 (not shown in FIG. 13).

Mobile device 1242 transmits a SIP 200 OK message that is received by S-CSCF 1222 acknowledging the end of the session. S-CSCF 1222 transmits the 200 OK message to P-CSCF 1218, which forwards the 200 OK message to mobile device 1212. The session is then released.

In FIG. 12, billing domain 1230 in home IMS network 1204 receives the S-CSCF CDR from CDF 1229. Billing system 1220 in visited IMS network 1202 receives the P-CSCF CDR from CDF 1219. Because these CDRs include the same ICIDs (e.g., both the home ICID and the visited ICID) and other shared charging information, billing domains 1230 and 1220 may advantageously correlate CDRs generated in both home IMS network 1204 and visited IMS network 1202. As a result, more accurate charging may be realized for the session. Also, because home IMS network 1204 and visited IMS network 1202 may share additional charging information, each billing domain is able to verify charging by the other billing domain for the session.

Although specific embodiments were described herein, the scope of the invention is not limited to those specific embodiments. The scope of the invention is defined by the following claims and any equivalents thereof.

We claim:

1. A communication network, comprising:
a visited IMS network adapted to provide service for a roaming user, the visited IMS network comprising:
a visited charging data system; and
a visited network element adapted to receive a first signaling message for a session from the roaming user, to assign a visited charging identifier for the session, to insert the visited charging identifier in the first signaling message, and to transmit the first signaling message to a home IMS network for the roaming user;
the visited network element further adapted to receive a second signaling message for the session from a home network element in the home IMS network, to process the second signaling message to identify a home charging identifier assigned to the session in the home IMS network and to identify additional home network charging information for the session, to generate a visited charging message for the session, to insert the home charging identifier, the visited charging identifier, and the additional home network charging information in the visited charging message, and to transmit the visited charging message to the visited charging data system;
the visited charging data system is adapted to receive the visited charging message from the visited network element, to process the visited charging message to identify the home charging identifier, the visited charging identifier, and the additional home network charging information for the session, to generate a visited Charging Data Record (CDR) for the session, to insert the home charging identifier, the visited charging identifier, and the additional home network charging information in the visited CDR, and to transmit the visited CDR to a visited billing system.

2. The communication network of claim 1 wherein:
the second signaling message comprises a SIP signaling message; and
the visited network element is further adapted to process a P-Charging-Vector in the SIP signaling message to identify the home charging identifier assigned to the session in the home IMS network.

3. The communication network of claim 1 further comprising:
the home IMS network comprising:
a home charging data system; and
the home network element adapted to assign the home charging identifier for the session, to insert the home charging identifier in the second signaling message, and to transmit the second signaling message to the visited IMS network.

4. The communication network of claim 3 wherein:
the home network element is further adapted to receive the first signaling message for the session from the visited network element, to process the first signaling message to identify the visited charging identifier assigned to the session in the visited IMS network, to generate a home charging message for the session, to insert the visited charging identifier and the home charging identifier in the home charging message, and to transmit the home charging message to the home charging data system.

5. The communication network of claim 4 wherein:
the home charging data system is adapted to receive the home charging message from the home network element, to process the home charging message to identify the visited charging identifier and the home charging identifier, to generate a home Charging Data Record (CDR) for the session, to insert the visited charging identifier and the home charging identifier in the home CDR, and to transmit the home CDR to a home billing system.

6. The communication network of claim 5 wherein:
the visited network element is further adapted to identify additional visited network charging information for the session, and to insert the additional visited network charging information in the first signaling message;
the home network element is further adapted to process the first signaling message from the visited network element to identify the additional visited network charging information for the session, and to insert the additional visited network charging information in the home charging message; and
the home charging data system is further adapted to process the home charging message to identify the additional visited network charging information for the session, and to insert the additional visited network charging information in the home CDR.

7. A method of sharing charging information between a home IMS network of a user and a visited IMS network that is providing service for the user that is roaming, the method comprising:
receiving a first signaling message for a session in a visited network element of the visited IMS network from the roaming user;
assigning a visited charging identifier for the session;
inserting the visited charging identifier in the first signaling message;
transmitting the first signaling message to the home IMS network;
receiving a second signaling message for the session from a home network element in the home IMS network;

processing the second signaling message to identify a home charging identifier assigned to the session in the home IMS network, and to identify additional home network charging information for the session;
generating a visited charging message for the session;
inserting the home charging identifier, the visited charging identifier, and the additional home network charging information in the visited charging message;
transmitting the visited charging message to a visited charging data system in the visited IMS network;
processing the visited charging message in the visited charging data system to identify the home charging identifier, the visited charging identifier, and the additional home network charging information;
generating a visited Charging Data Record (CDR) for the session;
inserting the home charging identifier, the visited charging identifier, and the additional home network charging information in the visited CDR; and
transmitting the visited CDR to a visited billing system.

8. The method of claim 7 wherein the second signaling message comprises a SIP signaling message, the method further comprising:
processing a P-Charging-Vector in the SIP signaling message to identify the home charging identifier assigned to the session in the home IMS network.

9. The method of claim 7 further comprising:
assigning the home charging identifier for the session in the home network element;
inserting the home charging identifier in the second signaling message; and
transmitting the second signaling message to the visited IMS network.

10. The method of claim 7 further comprising:
receiving the first signaling message for the session in the home network element from the visited network element;
processing the first signaling message to identify the visited charging identifier assigned to the session in the visited IMS network;
generating a home charging message for the session;
inserting the visited charging identifier and the home charging identifier in the home charging message; and
transmitting the home charging message to a home charging data system.

11. The method of claim 10 further comprising:
receiving the home charging message in the home charging data system;
processing the home charging message to identify the visited charging identifier and the home charging identifier;
generating a home Charging Data Record (CDR) for the session;
inserting the visited charging identifier and the home charging identifier in the home CDR; and
transmitting the home CDR to a home billing system.

12. The method of claim 11 further comprising:
identifying additional visited network charging information for the session in the visited network element;
inserting the additional visited network charging information in the first signaling message;
transmitting the first signaling message from the visited network element to the home network element;
processing the first signaling message in the home network element to identify the additional visited network charging information for the session;
inserting the additional visited network charging information in the home charging message;
transmitting the home charging message from the home network element to the home charging data system;
processing the home charging message in the home charging data system to identify the additional visited network charging information for the session;
inserting the additional visited network charging information in the home CDR; and
transmitting the home CDR to a home billing system.

* * * * *